United States Patent
Pfeifer (10) Patent No.: US 7,584,200 B2
(45) Date of Patent: Sep. 1, 2009

(54) GRAPHICAL DATABASE NAVIGATOR WITH RELATION LEVEL CONTROL

(75) Inventor: Michael Donald Pfeifer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 11/047,535

(22) Filed: Jan. 31, 2005

(65) Prior Publication Data

US 2006/0173881 A1    Aug. 3, 2006

(51) Int. Cl.
*G06F 7/00* (2006.01)
*G06F 17/00* (2006.01)

(52) U.S. Cl. .................. 707/101; 715/227
(58) Field of Classification Search ............ 715/227
See application file for complete search history.

(56) References Cited

U.S. PATENT DOCUMENTS

| | | | |
|---|---|---|---|
| 5,446,886 A * | 8/1995 | Li | 707/2 |
| 6,061,515 A * | 5/2000 | Chang et al. | 717/114 |
| 6,490,581 B1 * | 12/2002 | Neshatfar et al. | 707/4 |
| 6,675,294 B1 * | 1/2004 | Gupta et al. | 713/1 |
| 6,915,298 B1 * | 7/2005 | Cain et al. | 707/100 |
| 2002/0073078 A1 * | 6/2002 | Ku et al. | 707/3 |
| 2004/0017379 A1 * | 1/2004 | Ajito et al. | 345/600 |
| 2004/0260814 A1 * | 12/2004 | Budge et al. | 709/227 |
| 2004/0268236 A1 * | 12/2004 | Chidlovskii et al. | 715/513 |
| 2005/0246160 A1 * | 11/2005 | Zimmermann | 704/9 |
| 2006/0053128 A1 * | 3/2006 | Gestrelius et al. | 707/101 |

* cited by examiner

*Primary Examiner*—Hosain T Alam
*Assistant Examiner*—Azam Cheema
(74) *Attorney, Agent, or Firm*—Wood, Herron & Evans, LLP (57) ABSTRACT

Graphical maps of databases and related objects within a database have benefits for a database administrator. Instead of displaying all objects related to a node of interest, a user can select what maximum relation level to use to locate related objects. The mapping software starts at the initial node, or objects, and locates only those related objects that are within the maximum relation level as specified by the user. Only these located objects are displayed thereby producing a clearer and more concise map.

22 Claims, 6 Drawing Sheets

MAP THE FOLLOWING RELATED OBJECTS WHEN ADDING TO A MAP:

606 — [X] ALIASES ← 604           [ ] PRIMARY KEY CONSTRAINTS
[X] CHECK CONSTRAINTS             [ ] TABLES
[ ] FOREIGN KEY CONSTRAINTS       [ ] TABLES PARTITIONS
[X] INDEXES                       [X] TRIGGERS
[ ] JOURNALS                      [ ] UNIQUE KEY CONSTRAINTS
[ ] JOURNAL RECEIVERS             [ ] VIEWS
[ ] MATERIALIZED QUERY TABLES

OTHER USER PREFERENCES                                     608

FIGURE 6

GRAPHICAL DATABASE NAVIGATOR WITH RELATION LEVEL CONTROL

FIELD OF THE INVENTION

The invention relates to database management systems, and in particular, to graphical mapping of related objects within a database.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

There are currently graphical user interfaces that map a database and its relations so that a database administrator can graphically view the database objects. A skilled administrator is able to identify characteristics about the database from this map and potentially improve the structure and arrangement of the database. However, when a database becomes large, such as, for example, having hundreds or thousands of objects, the graphical map of the database and its relations becomes so complex and crowded so as to be of minimal use to the administrator.

In particular, in a current graphical user interface, selection of an object to find its relations results in a search being performed for each other object that relates to that object. The search, however, is iterative, resulting in searches being performed for the relations for the objects found in the initial result, and so on, until all relations that ultimately relate to the original object are found. Indeed, in situations where a database is normalized, a search of relations on an object will typically return every object in the database.

Display of all of the relations to a particular object in such a scenario is often so complex and crowded that it is difficult, if not impossible, to navigate. Furthermore, the more objects and relations that exist, the longer it takes to perform the search and generate the display.

Accordingly, there remains the need in current database systems for a graphical tool that presents database information in a format that is useful to a database administrator or other user.

SUMMARY OF THE INVENTION

Embodiments of the present invention relate to a database management tool that includes a graphical interface that allows a user to control the levels of relationships that are viewable on a database map. For example, a maximum relation level, representing the maximum number of relations to display relative to an object of focus, may be used to constrain the number of relations and related objects that are displayed on a database map.

Thus one aspect of the present invention relates to a method for graphically mapping objects in a database. In accordance with this aspect, an object of focus is identified within the database. A set of related objects within a maximum relation level of this object is located and this set of objects is graphically mapped. In one particular embodiment, the maximum relation level is configurable by a user in order to control the level of detail in the resulting map.

DETAILED DESCRIPTION

As mentioned above, the embodiments discussed hereinafter relate to a database management tool that includes a graphical interface that allows a user to control the levels of relationships that are viewable on a database map. A specific implementation of such a database management tool capable of supporting this functionality in a manner consistent with the invention will be discussed in greater detail below. However, prior to a discussion of such a specific implementation, a brief discussion will be provided regarding an exemplary hardware and software environment within which such an database management tool may reside.

Figure 1:
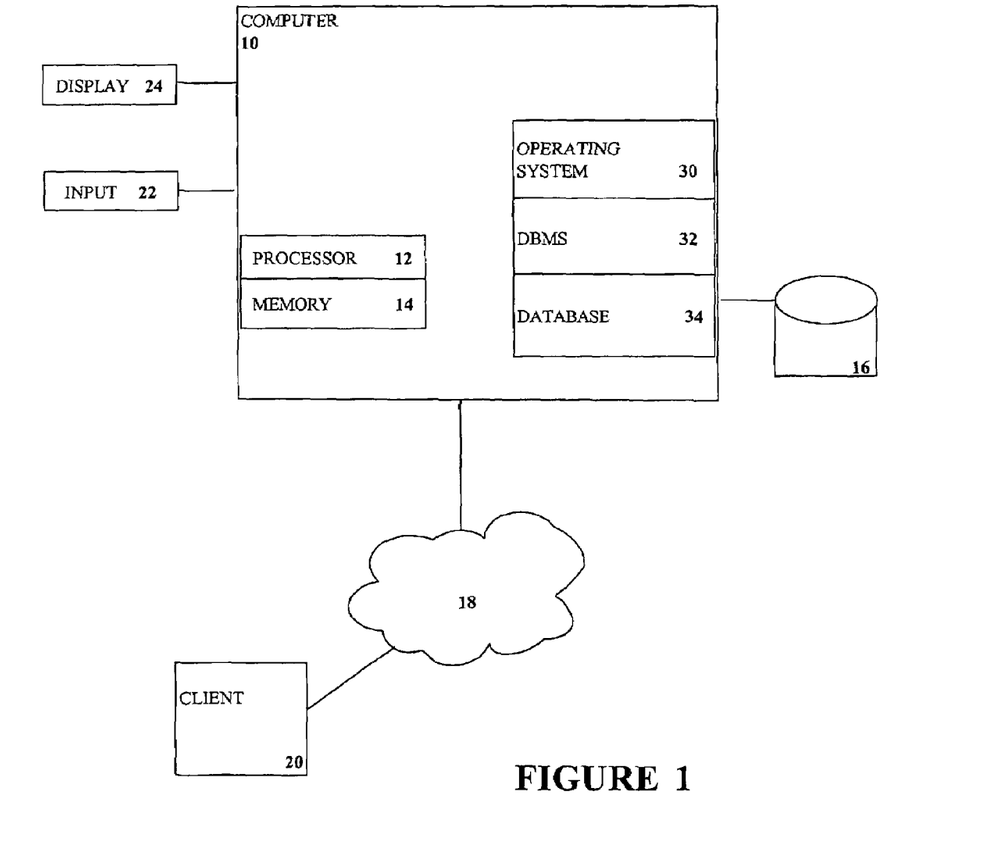
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management tool consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
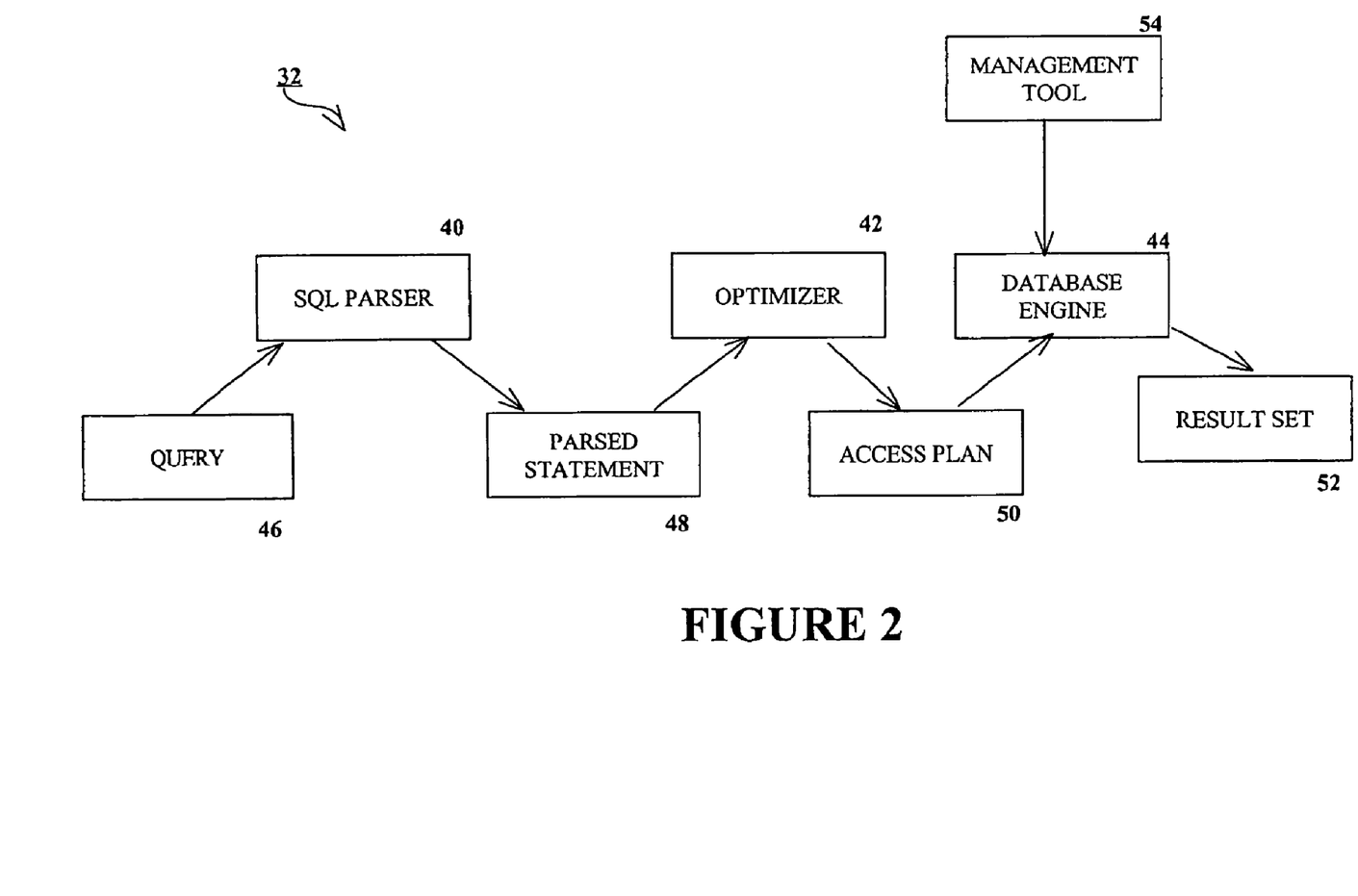
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. One such component is a management tool 54 that provides graphical mapping functionality. This management tool 54 is able to traverse a database to certain objects and any other objects related thereto. Furthermore, the management tool 54 produces a graphical map of the objects and relations that are located. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Now turning to a specific implementation of a database management tool consistent with the invention, it will be appreciated that, in conventional databases, more than simply tables are maintained. There are a number of objects that are related to different tables and to one another. These relationships may depend on referencing the same index, including the same foreign key, accessing the same table or table partition, etc. Thus, graphical tools have been developed that map the database and its objects according to the relationships that exist. One such product from International Business Machines Corporation, the current assignee, is Database Navigator™ which supports very detailed view of even the most complex databases. One of ordinary skill will recognize that other database mapping tools can be used without departing from the scope of the present invention.

Various database objects that can be graphically mapped using these and other tools include, but are not limited to, indexes, tables, views, journals, triggers, constraints, User Defined Functions, table partitions, aliases, materialized query tables, etc. A skilled database administrator will recognize when and where each of these objects is beneficial for analyzing a database and its underlying objects.

Typical graphical mapping software starts with a database object of interest and then locates all related objects and then repeats the process for each located object until no more related object or relationship are located. The located objects and their relationships are then graphically mapped. With so many different objects, the variety of ways objects can be related, and especially in a large database, the resulting graphical map may be so large and so crowded so as to be of limited use.

Figure 3:
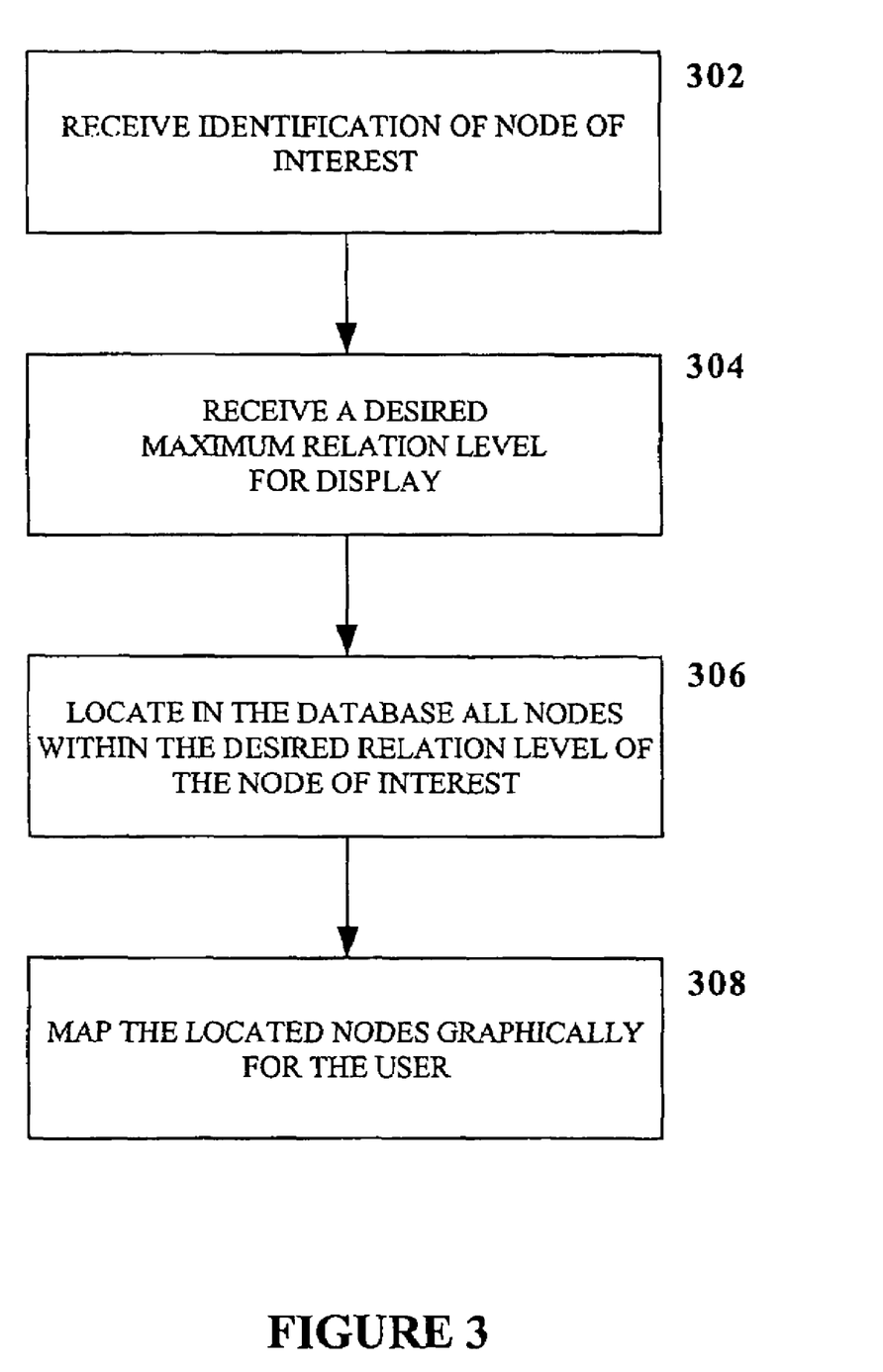
FIG. 3 illustrates a flowchart of an exemplary method for displaying a database map in accordance with the principles of the present invention.

Thus, in accordance with the principles of the present invention, a user is given control over how many levels of relation are to be traversed when locating related objects. FIG. 3 illustrates a flowchart of an exemplary method for displaying a database map in accordance with the principles of the present invention. In step 302, the user provides input indicating what object, or node, of the database is to be the focus of the graphical map. One of ordinary skill will recognize that this input may be provided in a variety of ways, such as pull down menus, dialog boxes, file and directory lists, iconographic windows, etc., without departing from the scope of the present invention.

Next, in step 304, the user also supplies a desired relation level setting for the map. This relation level may be a default value which the user is prompted to change, in the alternative, the user may need to explicitly supply the value for every map. In another embodiment, the user may simply set a value in a preference dialog, while in still another embodiment, the system may dictate a specific number of levels such that the user has no control over the number of levels.

With this information, the graphical mapping software, in step 306, locates the database object to start with and then locates every object having a relationship with that object. This initial set of objects satisfy a relation level of "1". The second set of objects which are each related to the initial set of objects, satisfies a relation level of "2". Continuing this concept, objects satisfying higher relation levels can be identified as well.

In performing step 306, the graphical mapping software maintains a value for which level it is currently locating related objects. When this value reaches the desired relation level provided by the user, then the traversal of the database objects ceases. In step 308, the located objects are displayed in a graphical map. Thus, the graphical mapping software performs its functions quicker than if it was required to find all related objects. Furthermore, the resulting graphical map is less crowded and confusing because it focuses on just the items of interest to the user.

Figure 4:
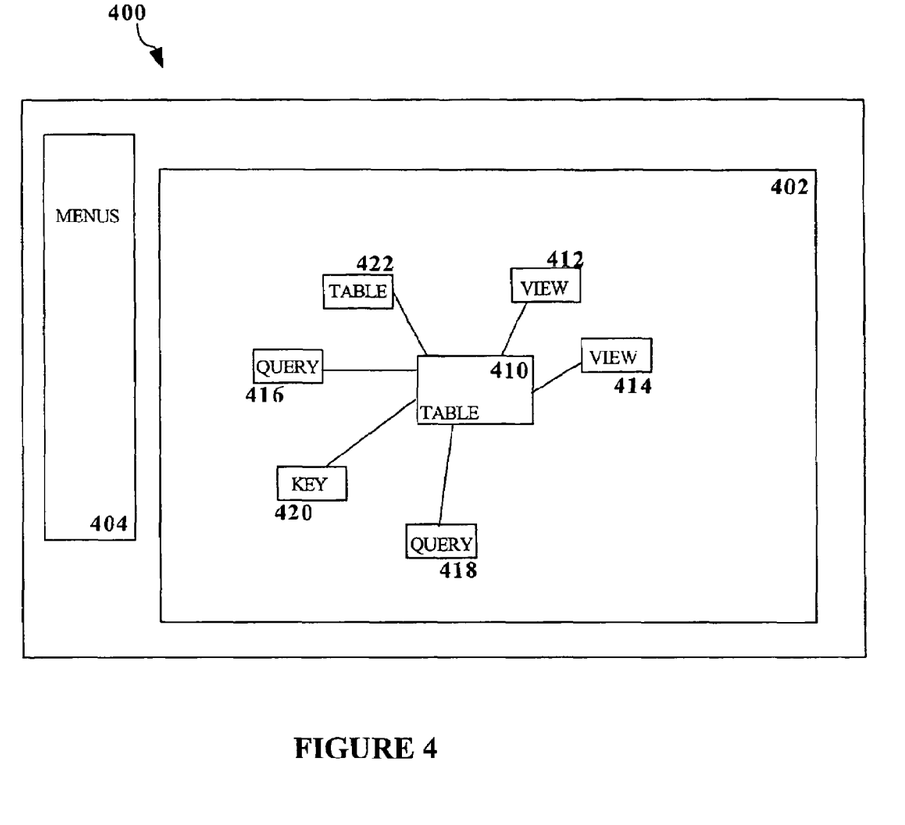
FIG. 4 illustrates an exemplary graphical interface for displaying a limited database map in accordance with an embodiment of the present invention.

FIG. 4 illustrates an exemplary graphical interface 400 for displaying a limited database map in accordance with an embodiment of the present invention. At the left-hand side, menus and other interface elements 404 are provided that implement a user interface. The display portion 402 is where a map of related objects is displayed. As with conventional graphical tools, the window 402 may be panned, scrolled, and zoomed to affect contents on display.

In the Database Navigator™ tool mentioned earlier, a drop down menu allows a user to select an option called "Add to Map". This option allows a user to identify a database, object (or node) and map it and its related objects to a new or current map. A similar option that may, for example, be used in accordance with the principles of the present invention would be "Add to Map Clipped". This option would operate similar to "Add to Map" but would provide an additional dialog box in which the user can specify the desired relation level to display on the map.

In the example map of FIG. 4, Table 1 (element 410) is the object that the user wanted to view. There are 6 related objects displayed as well: table 422, view 412, view 414, query 418, key 420 and query 416. These objects are one relation level from the table 410. If the user had selected, for example, a relation level of "2", then one or more of the objects 412-420 would also have other, respective objects pointing to them.

In addition to limiting the relation level that is displayed on a map, the user may also select the type of objects to display on a map. For example, a user may not want to view constraints or triggers on a map. In these instances, the graphical mapping software can omit these items from the map. One exemplary technique for providing this functionality is to present the user with a dialog box that lists all possible database object types. Using this dialog box, the user selects or de-selects the type of objects that will be included in the map.

Figure 5:
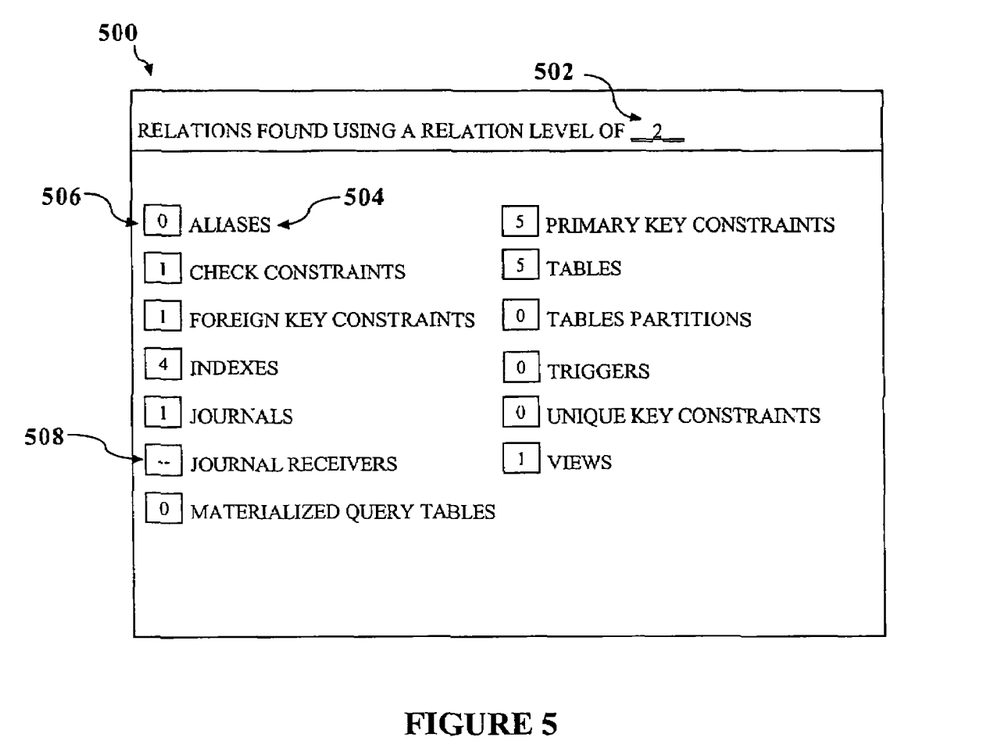
FIG. 5 illustrates an exemplary interface screen for providing textual information to a user in accordance with the principles of the present invention.

The interface screen 500 of FIG. 5 is one exemplary way that the graphical information of FIG. 4. In particular, a label 502 is displayed that explicitly alerts the user that the locating of related objects has been limited to a certain relation level. Below the label 502 is a summary of the different types of objects and how many of each have been located within the desired relation level. One of ordinary skill will recognize that the object types in the screen 500 are exemplary in nature and other object types may be included without departing from the scope of the present invention.

In this exemplary interface screen 500, each line includes an object label 504 and a corresponding display box 506. In the box 506, a number is displayed to reflect the number of these types of objects that have been located. The screen 500 can be displayed after all objects have been located or, alternatively, may be displayed while the search for related objects is on-going and dynamically updated each time a new object is located. In some instance, a user may not be interested in certain object type and will have set a preferences setting to omit these object types from the map. The display box 508 has an indicator other than a number to inform the user that these types of objects will not be located and mapped.

Figure 6:
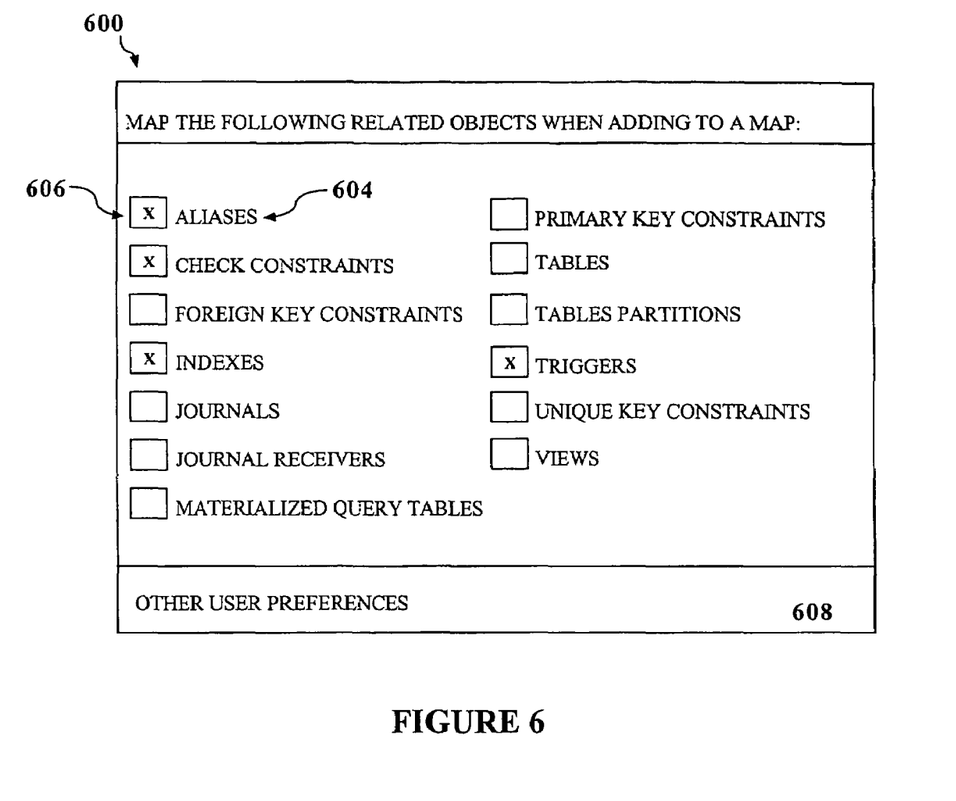
FIG. 6 illustrates an exemplary interface screen that permits a user to select what objects to display on a map in accordance with the principles of the present invention.

FIG. 6 illustrates one exemplary interface screen 600 that allows a user to set preferences. For example, each object type has a label 604 and a selection button 606. Using any of a variety of input means, a user may select or de-select which objects to include when locating and mapping objects. In addition to selecting object types, this screen 600 may include other preferences and options 608 that a user may select, including, for example, a default maximum relation level.

Various modifications may be made to the illustrated embodiments without departing from the spirit and scope of the invention. For example the terms column, row, field, table and value are usually used in connection with relational databases. However, these terms are not meant to limit the present invention to relational databases as these terms may be used in general to describe like entities in other types of databases such as, for example, object-oriented databases and flat file structures. Therefore, the invention lies in the claims hereinafter appended.

What is claimed is:

1. A method for graphically mapping objects in a database comprising the steps of:
    identifying an object of focus within the database;
    locating a set of related objects satisfying a maximum relation level and excluding from the set of related objects those objects that are related to the object of focus but that are beyond the maximum relation level; and
    graphically mapping the set of related objects, including generating a display of a database map in which the related objects in the set of related objects are included in the display while related objects that are beyond the maximum relation level are excluded from the display,
    wherein the object of focus is related to first and second related objects,
    wherein the first related object is within the maximum relation level relative to the object of focus,
    wherein the second related object is beyond the maximum relation level relative to the object of focus, and
    wherein generating the display of the database map includes including the first related object in the display but excluding the second related object from the display.

2. The method of claim 1, wherein the maximum relation level is more than one.

3. The method of claim 1, wherein the step of locating, further includes the steps of:
    locating an initial set of related objects within one relation level of the object of focus; and
    locating a secondary set of related objects within one relation level of the respective objects in the initial set.

4. The method of claim 3, further comprising the steps of:
    locating an additional set of objects within one relation level of the respective objects in the secondary set;
    repeating the step of locating additional sets of objects without exceeding the set maximum relation level; and
    graphically mapping all the different sets of objects.

5. The method of claim 1, wherein the database comprises objects that include one or more of: a key, a partition, a table, a trigger, a constraint, an index, a view, a query, a journal, and an alias.

6. The method according to claim 1, further comprising the step of:
    setting a maximum relation level relative to the object of focus.

7. A method for graphically mapping objects in a database comprising the steps of:
    a) identifying an object of focus within the database;
    b) iteratively identifying a set of related objects which are within a relation level of one relative to one or more previously identified objects;
    c) repeating step b) for a predetermined number of times associated with a maximum number of relation levels; and
    d) graphically mapping the identified related objects in a database map, including generating a display of the database map in which the identified related objects are included in the display, wherein at least one related object that is beyond the maximum number of relation levels is excluded from the database map,
    wherein the one or more previously identified objects is related to first and second related objects,
    wherein the first related object is within the maximum number of relation levels relative to the one or more previously identified objects,
    wherein the second related object is beyond the maximum number of relation levels relative to the one or more previously identified objects, and
    wherein the at least one related object that is beyond the maximum number of relation levels includes the second related object.

8. The method of claim 7, further comprising the step of: monitoring how many times step b) is performed.

9. The method of claim 7, further comprising the step of: receiving as input the predetermined number of times.

10. The method of claim 7, wherein the database comprises objects that include one or more of: a key, a partition, a table, a trigger, a constraint, an index, a view, a query, a journal, and an alias.

11. An apparatus for graphically displaying database objects, the apparatus comprising:
    at least one processor;
    a memory coupled with the at least one processor; and
    a program code residing in the memory and executed by the at least one processor, the program code configured to:
        identify an object of focus within the database;
        locate a set of related objects satisfying a maximum relation level and exclude from the set of related objects those objects that are related to the object of focus but that are beyond the maximum relation level; and
        graphically map the set of related objects, including generating a display of a database map in which the related objects in the set of related objects are included in the display while related objects that are beyond the maximum relation level are excluded from the display,
        wherein the object of focus is related to first and second related objects,
        wherein the first related object is within the maximum relation level relative to the object of focus,
        wherein the second related object is beyond the maximum relation level relative to the object of focus, and
        wherein generating the display of the database map includes including the first related object in the display but excluding the second related object from the display.

12. The apparatus of claim 11, wherein the maximum relation level is more than one.

13. The apparatus of claim 11, wherein the program code is further configured to:
> locate an initial set of related object within one relation level of the object of focus; and
> locate a secondary set of related objects within one relation level of the respective objects in the initial set.

14. The apparatus of claim 13, wherein the program code is further configured to:
> locate an additional set of objects within one relation level of the respective objects in the secondary set;
> repeat the step of locating additional sets of objects without exceeding the set maximum relation level; and
> graphically map all the different sets of objects.

15. The apparatus of claim 11, wherein the database comprises objects that include one or more of: a key, a partition, a table, a trigger, a constraint, an index, a view, a query, a journal, and an alias.

16. The apparatus of claim 11, wherein the program code is further configured to:
> set a maximum relation level relative to the object of focus.

17. A program product for graphically mapping database objects, comprising:
> program code configured upon execution thereof to:
> identify an object of focus within the database;
> locate a set of related objects satisfying a maximum relation level and exclude from the set of related objects those objects that are related to the object of focus but that are beyond the maximum relation level; and
> graphically map the set of related objects, including generating a display of a database map in which the related objects in the set of related objects are included in the display while related objects that are beyond the maximum relation level are excluded from the display,
> wherein the object of focus is related to first and second related objects,
> wherein the first related object is within the maximum relation level relative to the object of focus,
> wherein the second related object is beyond the maximum relation level relative to the object of focus, and
> wherein generating the display of the database map includes including the first related object in the display but excluding the second related object from the display; and
> a recordable computer readable medium bearing the program code.

18. The program product of claim 17, wherein the maximum relation level is more than one.

19. The program product of claim 17, wherein the program code is further configured to:
> locate an initial set of related object within one relation level of the object of focus; and
> locate a secondary set of related objects within one relation level of the respective objects in the initial set.

20. The program product of claim 19, wherein the program code is further configured to:
> locate an additional set of objects within one relation level of the respective objects in the secondary set;
> repeat the step of locating additional sets of objects without exceeding the set maximum relation level; and
> graphically map all the different sets of objects.

21. The program product of claim 17, wherein the database comprises objects that include one or more of: a key, a partition, a table, a trigger, a constraint, an index, a view, a query, a journal, and an alias.

22. The program product of claim 17, wherein the program code is further configured to:
> set a maximum relation level relative to the object of focus.

* * * * *

UNITED STATES PATENT AND TRADEMARK OFFICE
CERTIFICATE OF CORRECTION

PATENT NO. : 7,584,200 B2  Page 1 of 1
APPLICATION NO. : 11/047535
DATED : September 1, 2009
INVENTOR(S) : Michael Donald Pfeifer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this

Fourteenth Day of September, 2010

David J. Kappos
*Director of the United States Patent and Trademark Office*